US008662535B2

(12) United States Patent
Andersen et al.

(10) Patent No.: US 8,662,535 B2
(45) Date of Patent: Mar. 4, 2014

(54) SUPPORT FRAME VEHICLE RESTRAINTS (75) Inventors: Jonathan Andersen, Racine, WI (US); Ben Wieberdink, Cedar Grove, WI (US); Timothy Cotton, Milwaukee, WI (US); Pamala Pietrangelo, Oak Creek, WI (US); Kurt Lessard, South Milwaukee, WI (US); Norbert Hahn, Franklin, WI (US); Henk De Lang, Maarssen (NL)

(73) Assignee: Rite-Hite Holding Corporation, Milwaukee, WI (US)

( * ) Notice: Subject to any disclaimer, the term of this patent is extended or adjusted under 35 U.S.C. 154(b) by 70 days.

(21) Appl. No.: 13/073,418

(22) Filed: Mar. 28, 2011

(65) Prior Publication Data
US 2011/0176896 A1 Jul. 21, 2011

Related U.S. Application Data (63) Continuation of application No. 12/119,974, filed on May 13, 2008, now Pat. No. 7,914,042.

(51) Int. Cl.
B60R 19/54 (2006.01)
(52) U.S. Cl.
USPC .......... 280/762; 280/760; 280/491.1
(58) Field of Classification Search
USPC .......... 280/762, 491.1, 482, 149.2, 656, 760; 414/401, 402, 809
See application file for complete search history.

(56) References Cited

U.S. PATENT DOCUMENTS

| 553,987 | A | 2/1896 | Heath et al. |
|---|---|---|---|
| 1,418,966 | A | 6/1922 | Perin |
| 1,494,484 | A | 5/1924 | Hudspeth |
| 1,778,852 | A | 10/1930 | Fitch |
| 1,786,463 | A | 12/1930 | Thomas |
| 2,637,454 | A | 5/1953 | Rowe |

(Continued)

FOREIGN PATENT DOCUMENTS

| CH | 383789 | 10/1964 |
|---|---|---|
| DE | 653079 | 11/1937 |

(Continued)

OTHER PUBLICATIONS

European Patent Office, "Examination Report," issued in connection with application serial No. 09 747 032.2, issued May 24, 2012, 5 pages.
Applied Handling, Inc., Drawing and Photographs of Trailer Despringer System, Mar. 7, 2003, 3 pages.
Joyce-Dayton Corp. Concept Drawing, Jan. 15, 1986, 1 page.
Mead/Westvaco, Photographs of Mead/Westvaco installation in the Netherlands, Nov. 17, 2003, 2 pages.

(Continued)

*Primary Examiner* — Hau Phan
(74) *Attorney, Agent, or Firm* — Hanley, Flight & Zimmerman, LLC.

(57) ABSTRACT

Restraints for restraining a vehicle at a loading dock are described. An example restraint described herein includes a brace movable between a holding position and a release position. A first portion of the brace engages a supporting portion of the vehicle and a second portion of the brace engages a non-movable location at the loading dock to restrain the vehicle relative to the loading dock when the brace is in the holding position. For the holding position, the first portion of the brace moves in one direction underneath the vehicle to engage the supporting portion and the second portion moves in a second direction underneath the vehicle to engage the non-movable location. The first and second portions retract to allow the vehicle to move relative to the loading dock when the brace is in the release position.

20 Claims, 7 Drawing Sheets

(56) References Cited

U.S. PATENT DOCUMENTS

| | | |
|---|---|---|
| 2,693,284 A | 11/1954 | Gerhardt |
| 2,766,007 A | 10/1956 | Krilanovich |
| 2,841,247 A | 7/1958 | Smalley |
| 3,117,800 A | 1/1964 | Magnuson |
| 3,180,282 A | 4/1965 | Gutridge et al. |
| 3,183,854 A | 5/1965 | Candlin, Jr. et al. |
| 3,188,982 A | 6/1965 | Bergen et al. |
| 3,189,307 A | 6/1965 | Peterson |
| 3,214,188 A | 10/1965 | Alfieri |
| 3,235,211 A | 2/1966 | Robinson et al. |
| 3,235,285 A | 2/1966 | Tenenbaum et al. |
| 3,250,506 A | 5/1966 | Thouvenelle et al. |
| 3,281,160 A | 10/1966 | Vinther et al. |
| 3,289,987 A | 12/1966 | Candlin, Jr. et al. |
| 3,292,802 A | 12/1966 | Hutchinson |
| 3,317,004 A | 5/1967 | Harrison, Jr. |
| 3,337,170 A | 8/1967 | Remy et al. |
| 3,355,136 A | 11/1967 | Staples |
| 3,392,944 A | 7/1968 | Wyrough |
| 3,404,444 A | 10/1968 | Isbrandtsen |
| 3,439,821 A | 4/1969 | Hand |
| 3,490,723 A | 1/1970 | Atkinson |
| 3,537,724 A | 11/1970 | Matthews |
| 3,556,481 A | 1/1971 | Mueller et al. |
| 3,566,804 A | 3/1971 | Mietla |
| 3,606,219 A | 9/1971 | Hammonds et al. |
| 3,666,118 A | 5/1972 | Raynes et al. |
| 3,694,724 A | 9/1972 | Eggert, Jr. |
| 3,765,692 A | 10/1973 | Barber et al. |
| 3,810,500 A | 5/1974 | Brun et al. |
| 3,860,209 A | 1/1975 | Strecker |
| 4,014,517 A | 3/1977 | Keagle |
| 4,023,649 A | 5/1977 | Wood |
| 4,037,822 A | 7/1977 | Barcella |
| 4,099,695 A | 7/1978 | Shinn, Jr. |
| 4,146,888 A | 3/1979 | Grunewald et al. |
| 4,191,503 A | 3/1980 | Neff et al. |
| 4,208,161 A | 6/1980 | Hipp et al. |
| 4,221,280 A | 9/1980 | Richards |
| 4,249,840 A | 2/1981 | Kallaes et al. |
| 4,264,259 A | 4/1981 | Hipp |
| 4,267,748 A | 5/1981 | Grunewald et al. |
| 4,282,621 A | 8/1981 | Anthony et al. |
| 4,319,666 A | 3/1982 | Hunter |
| 4,321,000 A | 3/1982 | Novak |
| 4,335,901 A | 6/1982 | Gladish |
| 4,373,847 A | 2/1983 | Hipp et al. |
| 4,379,354 A | 4/1983 | Hahn et al. |
| 4,397,594 A | 8/1983 | Hammonds et al. |
| 4,403,680 A | 9/1983 | Hillesheimer |
| 4,443,150 A | 4/1984 | Hahn et al. |
| 4,456,278 A | 6/1984 | Chapman |
| 4,456,413 A | 6/1984 | Pavlick |
| 4,462,569 A | 7/1984 | Arzouman |
| 4,472,099 A | 9/1984 | Hahn et al. |
| 4,488,325 A | 12/1984 | Bennett et al. |
| 4,524,699 A | 6/1985 | Pavlick |
| 4,547,107 A | 10/1985 | Krause |
| 4,553,895 A | 11/1985 | Ellis |
| 4,558,886 A | 12/1985 | Straub |
| 4,560,315 A | 12/1985 | Hahn |
| 4,573,663 A | 3/1986 | Nussbaum |
| 4,605,353 A | 8/1986 | Hahn et al. |
| 4,634,334 A | 1/1987 | Hahn et al. |
| 4,636,119 A | 1/1987 | Terlecky |
| 4,648,764 A | 3/1987 | Pavlick |
| 4,671,714 A | 6/1987 | Bennett |
| 4,692,755 A | 9/1987 | Hahn |
| 4,712,653 A | 12/1987 | Franklin et al. |
| 4,718,800 A | 1/1988 | Engle |
| 4,724,930 A | 2/1988 | VanLierop |
| 4,728,242 A | 3/1988 | Erlandsson |
| 4,735,542 A | 4/1988 | Fisher et al. |
| 4,743,150 A | 5/1988 | Hlinsky |
| 4,756,172 A | 7/1988 | Weaver |
| RE32,736 E | 8/1988 | Lovell |
| 4,815,918 A | 3/1989 | Bennett et al. |
| 4,822,004 A | 4/1989 | Van Lierop |
| 4,830,563 A | 5/1989 | Yeakle |
| 4,858,888 A | 8/1989 | Cruz et al. |
| 4,861,217 A | 8/1989 | Erlandsson |
| 4,865,295 A | 9/1989 | Holloway |
| 4,915,568 A | 4/1990 | West |
| 4,936,731 A | 6/1990 | Noble |
| 4,938,648 A | 7/1990 | Horan et al. |
| 4,940,371 A | 7/1990 | Cholovich |
| 4,973,213 A | 11/1990 | Erlandsson |
| 4,978,104 A | 12/1990 | Gipson, Jr. |
| 5,013,011 A | 5/1991 | Halloway |
| 5,017,064 A | 5/1991 | Kirwan et al. |
| 5,017,065 A | 5/1991 | Krug et al. |
| 5,020,445 A | 6/1991 | Adams, Jr. |
| 5,048,896 A | 9/1991 | Channell |
| 5,052,868 A | 10/1991 | Hesch et al. |
| 5,054,987 A | 10/1991 | Thornton |
| 5,068,938 A | 12/1991 | Roscoe |
| 5,100,105 A | 3/1992 | Schneider et al. |
| 5,107,772 A | 4/1992 | Viens |
| 5,112,172 A | 5/1992 | Engle |
| 5,165,265 A | 11/1992 | Maionchi |
| 5,192,057 A | 3/1993 | Wydra et al. |
| 5,212,846 A | 5/1993 | Hahn |
| 5,224,311 A | 7/1993 | Pearce |
| 5,291,835 A | 3/1994 | Wicks |
| 5,297,921 A | 3/1994 | Springer et al. |
| 5,338,136 A | 8/1994 | Hetchler |
| 5,340,082 A | 8/1994 | Holloway |
| 5,340,141 A | 8/1994 | Thorndyke |
| 5,375,965 A | 12/1994 | Springer et al. |
| 5,388,947 A | 2/1995 | Ancel et al. |
| 5,407,309 A | 4/1995 | Hesch et al. |
| 5,433,578 A | 7/1995 | Honan |
| 5,490,748 A | 2/1996 | Hapeman |
| 5,490,749 A | 2/1996 | Arbues |
| 5,494,387 A | 2/1996 | Ruegg |
| 5,505,575 A | 4/1996 | Alexander |
| 5,509,687 A | 4/1996 | Thorndike |
| 5,542,798 A | 8/1996 | Rawdon et al. |
| 5,553,987 A | 9/1996 | Ellis |
| 5,575,492 A | 11/1996 | Stone |
| 5,582,498 A | 12/1996 | Springer et al. |
| 5,620,195 A | 4/1997 | Wessels |
| 5,702,223 A | 12/1997 | Hahn et al. |
| 5,709,286 A | 1/1998 | Mead et al. |
| 5,839,864 A | 11/1998 | Reynard |
| 5,845,579 A | 12/1998 | Langley et al. |
| 5,868,379 A | 2/1999 | Ellis |
| 5,882,167 A | 3/1999 | Hahn et al. |
| 5,890,835 A | 4/1999 | Basta et al. |
| 5,941,666 A | 8/1999 | Waters |
| 5,961,263 A | 10/1999 | Nunez |
| 5,964,572 A | 10/1999 | Hahn et al. |
| 6,017,173 A | 1/2000 | Anthony et al. |
| 6,065,923 A | 5/2000 | Foster |
| 6,089,544 A | 7/2000 | Ellis |
| 6,106,212 A | 8/2000 | Hahn |
| 6,113,337 A | 9/2000 | Massey |
| 6,116,839 A | 9/2000 | Bender et al. |
| 6,152,486 A | 11/2000 | Pierce |
| 6,190,109 B1 | 2/2001 | Bender |
| 6,199,876 B1 | 3/2001 | Eckelberry |
| 6,203,026 B1 | 3/2001 | Jones |
| 6,257,597 B1 | 7/2001 | Galazin |
| 6,318,947 B1 | 11/2001 | Hahn et al. |
| 6,322,310 B1 | 11/2001 | Bender et al. |
| 6,431,819 B1 | 8/2002 | Hahn |
| 6,488,464 B1 | 12/2002 | Kish |
| 6,726,432 B2 | 4/2004 | Kish et al. |
| 6,773,221 B2* | 8/2004 | Belongia et al. .............. 414/401 |
| 7,056,077 B2 | 6/2006 | Pedersen et al. |
| 7,533,896 B2 | 5/2009 | Zhang et al. |
| 7,704,025 B2* | 4/2010 | Schmidt et al. .................. 410/59 |
| 7,841,823 B2* | 11/2010 | Sveum et al. .................. 414/401 |
| 7,914,042 B2 | 3/2011 | Andersen et al. |

(56) References Cited

U.S. PATENT DOCUMENTS

| | | |
|---|---|---|
| 2002/0141852 A1 | 10/2002 | Hahn et al. |
| 2002/0168255 A1 | 11/2002 | Kish |
| 2003/0170097 A1 | 9/2003 | Pedersen et al. |
| 2004/0003970 A1 | 1/2004 | Alexander |
| 2005/0169732 A1 | 8/2005 | Sveum et al. |
| 2005/0196255 A1 | 9/2005 | Sveum et al. |
| 2007/0248440 A1 | 10/2007 | Andersen et al. |
| 2009/0283999 A1 | 11/2009 | Andersen et al. |

FOREIGN PATENT DOCUMENTS

| | | |
|---|---|---|
| DE | 2149062 | 4/1973 |
| DE | 2239483 | 2/1974 |
| DE | 2952658 | 7/1981 |
| DE | 3425498 | 3/1985 |
| EP | 0510372 | 10/1992 |
| EP | 0510467 | 10/1992 |
| EP | 0706912 | 4/1996 |
| EP | 1120371 | 8/2001 |
| FR | 1334344 | 8/1963 |
| FR | 2636717 | 3/1990 |
| GB | 927806 | 6/1963 |
| GB | 2223220 | 4/1990 |
| GB | 2237329 | 5/1991 |
| JP | 61114930 | 6/1986 |
| WO | 79/00576 | 8/1979 |
| WO | 88/08403 | 11/1988 |
| WO | 90/09339 | 8/1990 |
| WO | 93/01952 | 2/1993 |
| WO | 0043303 | 7/2000 |
| WO | 2004078618 | 9/2004 |

OTHER PUBLICATIONS

Pepsi, Co., Photographs of Pepsi, Co. installation in Minneapolis, MN, Apr. 18, 2006, 2 pages.

Rite-Hite Europe, "Trailer Jack," Jan. 1, 2000, 3 pages.

International Searching Authority, "International Search Report," issued in connection with international application serial No. PCT/US2009/035154, mailed May 8, 2009, 5 pages.

International Searching Authority, "Written Opinion of the International Searching Authority," issued in connection with international application serial No. PCT/US2009/035154, mailed May 8, 2009, 10 pages.

International Bureau, "International Preliminary Report on Patentability," issued in connection with international application serial No. PCT/US2009/035154, mailed Nov. 25, 2010, 11 pages.

United States Patent and Trademark Office, "Notice of Allowance," issued in connection with U.S. Appl. No. 12/119,974, mailed Nov. 22, 2010, 18 pages.

United States Patent and Trademark Office, "Notice of Allowance," issued in connection with U.S. Appl. No. 12/119,974, mailed Aug. 4, 2010, 15 pages.

European Patent Office, "Certificate of Grant," issued in connection with European Patent Application No. 09747032.2, on Oct. 23, 2013, 17 pages.

European Patent Office, "European Search Report," issued in connection with European Patent No. 1300436.3-1707, on Nov. 26, 2013, 7 pages.

\* cited by examiner

FIG. 13

SUPPORT FRAME VEHICLE RESTRAINTS

CROSS-REFERENCE TO RELATED APPLICATIONS

This patent arises as a continuation of U.S. patent application Ser. No. 12/119,974, filed on May 13, 2008, titled "Support Frame Vehicle Restraints", which is incorporated herein by reference in its entirety.

FIELD OF THE DISCLOSURE

The subject invention generally pertains to restraining vehicles at loading docks and more specifically to restraints that engages a weight-supporting rail of a vehicle support frame.

BACKGROUND

When a truck, trailer, or some other vehicle is parked at a loading dock, often some type of vehicle restraint is used to keep the truck from inadvertently moving away from an elevated platform of the dock. This allows forklifts and other material handling equipment to safely travel between the dock platform and the truck for the purpose of loading or unloading the truck's cargo.

There are a variety of vehicle restraints available that can be installed at a loading dock for engaging a truck's RIG (Rear Impact Guard), also known as an ICC bar. An ICC bar is a beam that extends horizontally across the rear of a truck, just below the truck bed. Its primary purpose is to prevent an automobile from under-riding the truck in a rear-end collision. However, not all trucks have an ICC bar that can be readily engaged by an ICC-style restraint. In those cases, a wheel restraint might be used for blocking one or more of the truck's wheels.

Perhaps the most common wheel restraint is simply a wheel chock that wedges between the driveway and the underside of the wheel. However, wheel chocks often slip out of position on driveways that are slippery due to oil, rain, ice, sand, gravel, or dirt. Sometimes wheel chocks wedge so tightly under the wheel that they become very difficult to remove. Trucks have also been known to drive completely up and over a wheel chock. Additionally, wheel chocks are often loose items that are not permanently attached to the loading dock area, so they tend to get misplaced.

Some known restraints include powered wheel restraints that travel along a track. However, such wheel restraints cannot always be readily installed at loading docks that might have a drain or some other driveway irregularity situated where the track is to be installed. Moreover, powered wheel restraints are relatively expensive.

DETAILED DESCRIPTION

Figure 1:
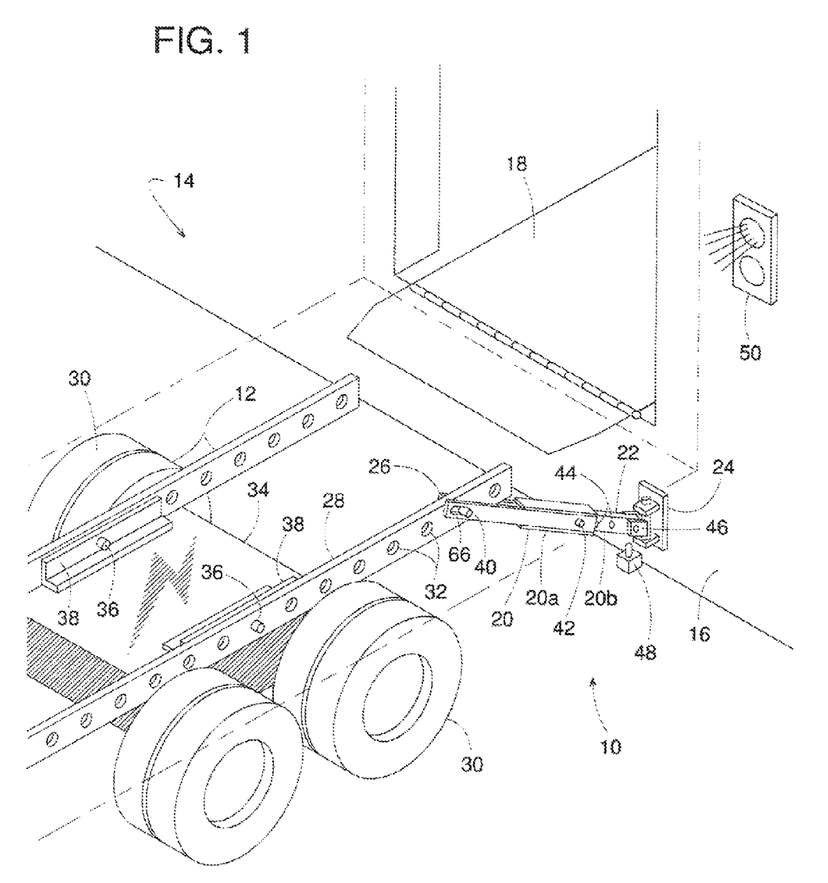
FIG. 1 is a perspective view a vehicle restraint in a holding position.
Figure 2:
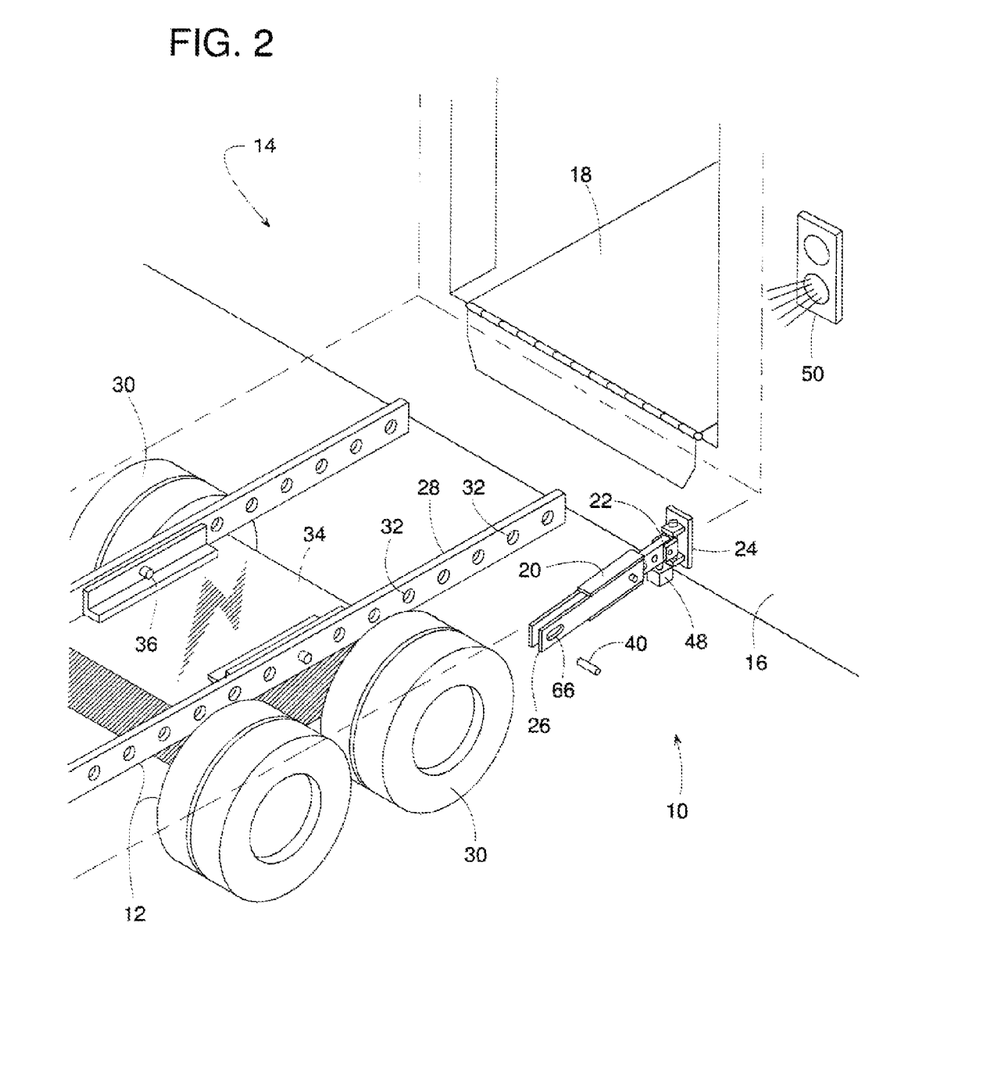
FIG. 2 is a perspective view of the vehicle restraint of FIG. 1 but showing the restraint in a release position.

FIGS. 1 and 2 show a restraint 10 for restraining a vehicle 12 at a loading dock 14. Restraint 10 is shown in a holding position in FIG. 1 and is shown in a release position in FIG. 2. In the holding or engaged position, restraint 10 helps hold vehicle 14 adjacent a dock face 16 so that cargo can be safely conveyed on and off of vehicle 12. In some cases, a conventional dock leveler 18 can be used to facilitate the loading and unloading operations. An upper section of vehicle 12 is shown in phantom lines to more clearly show restraint 10 in the holding position.

Restraint 10 includes an elongate member 20 having an anchored end 22 pivotally coupled to an anchor 24 that may be installed at a generally fixed location. An engagement end 26 of elongate member 20 is adapted to selectively attach and release a rail 28 or some other supporting frame structure of vehicle 12.

Rail 28 is preferably interposed laterally between a set of wheels 30 so that the restraining force exerted on vehicle 12 is more evenly (e.g., centrally) applied, rather than pulling on the vehicle's 12 outer sides. In this manner, because rail 28 is "laterally" interposed between wheels 30, rail 28 may be at an elevation higher than the uppermost surface of wheels 30. This is particularly advantageous because a restrained vehicle attempting to pull away from the dock can generate significant strain in the vehicle's frame. To help reduce the strain in certain areas of the vehicle's frame (e.g., where the ICC bar connects to the frame), rail 28 or the restraint's engagement therewith is preferably at a connection or connection point that is higher than the wheels' rotational axis and nearly inline with the bottom of the truck/trailer bed, in contrast to a typical ICC bar that is well below the truck/trailer bed.

Restraint 10 is particularly advantageous for use with rails (e.g., rail 28 in FIGS. 1-2) that are commonly known as "bogey rails." A bogey rail is a frame member that supports the bed of a truck or trailer and includes a plurality of holes 32. Holes 32 allows a rear axle assembly 34 to be slidingly adjusted and coupled in position to rail 28 via a pin 36 that fits through a flange 38 of axle assembly 34 and one of holes 32. Adjusting the position of axle assembly 34 to a forward position can improve the vehicle's maneuverability in town or on smaller streets, and a more rearward position can improve the vehicle's stability over the highway. In some cases, the axle's position is adjusted to more evenly distribute the weight carried by the vehicle's wheels.

Although the actual design of restraint 10 may vary, in some examples, engagement end 26 connects to rail 28 via a clevis connection and a removable pin 40. To accommodate some angular or lateral misalignment between rail 28 and anchor 24, there is clearance (e.g., preferably ample play) between rail 28 and the clevis of engagement end 26. In other examples, elongate member 20 includes a pivotal joint or limited-movement slip joint near engagement end 26, thereby providing end 26 with some articulation or limited movement so that pin 40 can be readily aligned with at least one hole 32. A similar result can be achieved by providing a slot 66 at pin 40 or providing any other suitable pin/slot connection between engagement end 26 and anchor 24 (e.g., a slot 66' of FIG. 3). Such a pin/slot or equivalent connection also makes it easier to disengage elongate member 20 for releasing vehicle 12

Additionally or alternatively, elongate member 20 comprises a pair of telescoping members 20a and 20b for further adjustment. A removable pin 42 selectively inserted in one of a series of holes 44 in member 20b provides elongate member 20 with an adjustable length.

To facilitate aligning engagement end 26 to rail 28, anchor 24 preferably comprises a universal joint 46 that allows elongate member 20 to pivot (e.g., in a vertical and/or horizontal direction). The pivotal motion enables elongate member 20 to pivot between the positions shown in FIGS. 1 and 2.

In some examples, restraint 10 includes a sensor 48 (e.g., limit switch, proximity switch, etc.) that detects whether restraint 10 is in its holding position of FIG. 1 or its release position of FIG. 2. Sensor 48 transmits or sends a signal to one or more indicator signals 50 accordingly. Examples of signal 50 include, but are not limited to, indoor or outdoor red and green lights. Sensor 48 is shown near anchor 24 to detect the angular position of elongate member 20. However, in other examples, sensor 48 may be positioned in any other suitable manner to detect the position or state of engagement of restraint 10.

Figure 3:
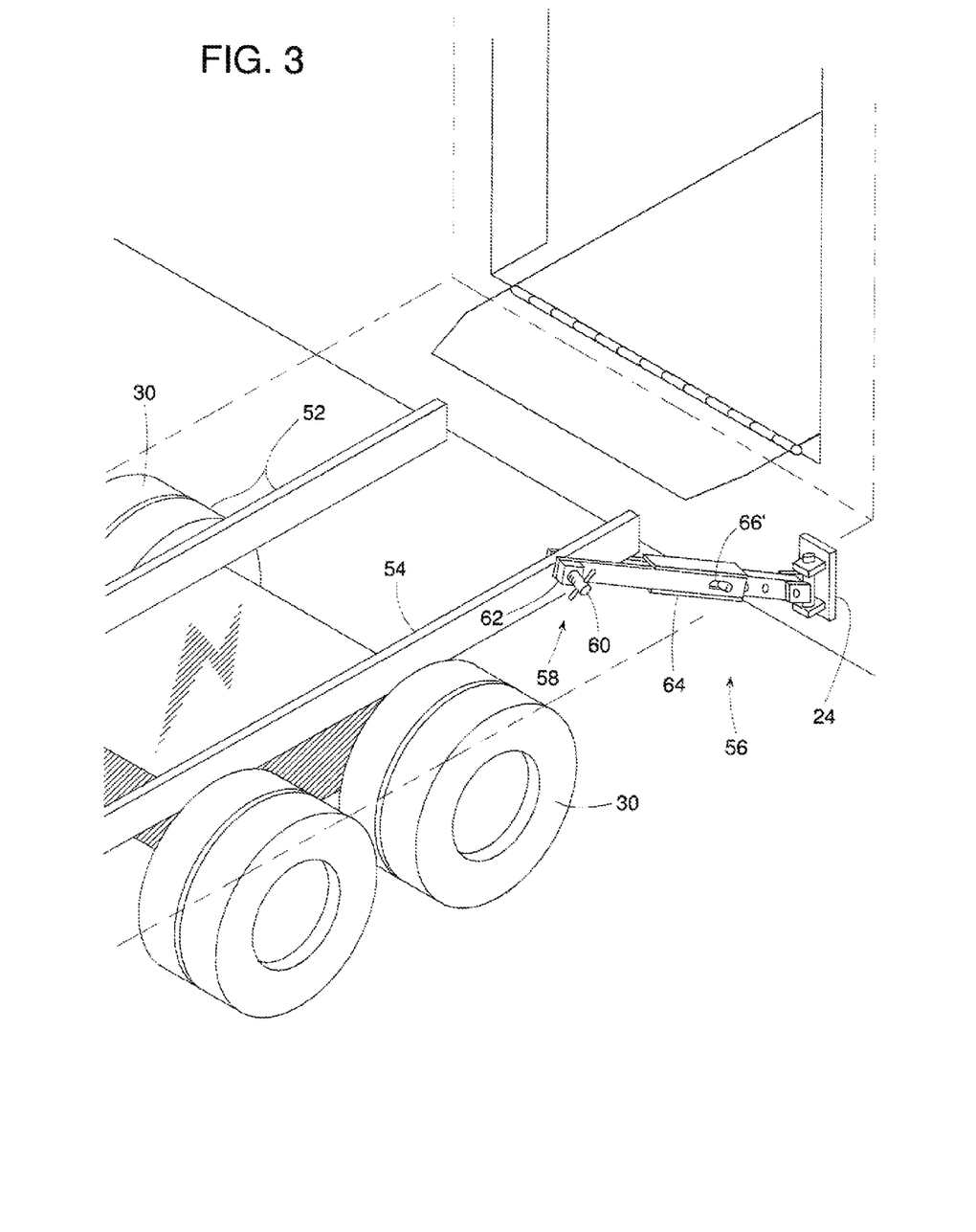
FIG. 3 is a perspective view of another vehicle restraint in a holding position.

For some vehicles, the position of the wheels is nonadjustable. FIG. 3, for instance, shows a vehicle 52 with wheels 30 installed at a fixed position. In this case, vehicle 52 includes a structural rail 54 that does not have a series of holes for adjustment. So, instead of a pin engaging a hole in the rail, a restraint 56 includes a clamp 58 that may frictionally engage or grip rail 54. Clamp 58, for example, may include a screw 60 that screws into a threaded hole in an engagement end 62 of an elongate member 64 that is otherwise similar to member 20.

In other examples, if a vehicle such as, for example, vehicle 12 of FIGS. 1-2, were to arrive at the dock, screw 60 may be operated to extend into one of holes 32, whereby screw 60 rather than pin 40 would extend into hole 32. In yet other examples, for vehicles with rails having no adjustment holes, one or more holes comparable to hole 32 could be produced in the rail solely for the purpose of being engaged by restraints 10 or 56. Such holes may be retrofit to existing vehicles and/or may be created when the vehicle is manufactured or at any time thereafter.

In other examples, such as where a vehicle's wheels have been adjusted to their fully back position, thus leaving no open holes behind the wheels, restraint 10 or 56 may be relocated to a position in front of wheels 30 to engage rail holes in that area. The repositioning of restraint 10 or 56 may be done by moving anchor 24 to the new forward location and fastening anchor 24 to a surface generally in front of wheels 30 such as, for example, a driveway surface. Alternatively, a second anchor may be permanently installed at the more forward location, and elongate member 20 or 64 may be selectively attached to and released from the anchor located at the most suitable location.

Figure 4:
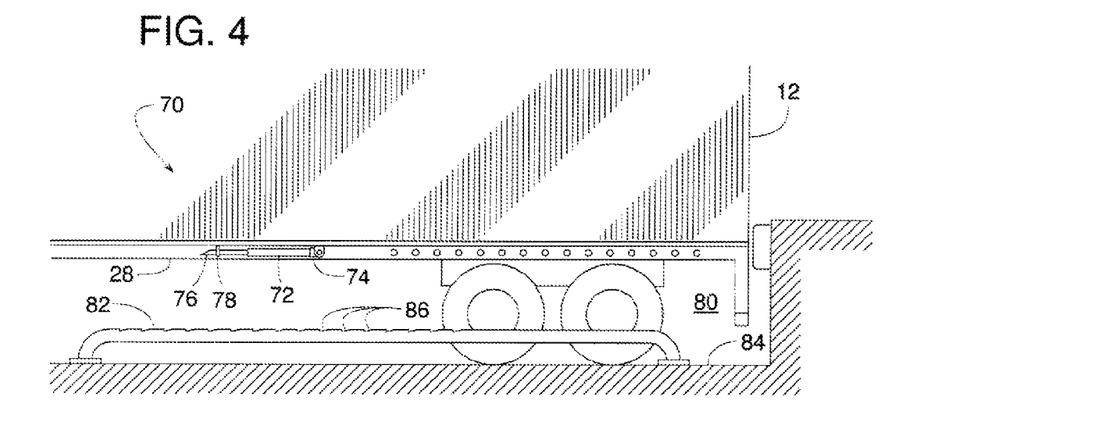
FIG. 4 illustrates another example vehicle restraint described herein shown in a release position.
Figure 5:
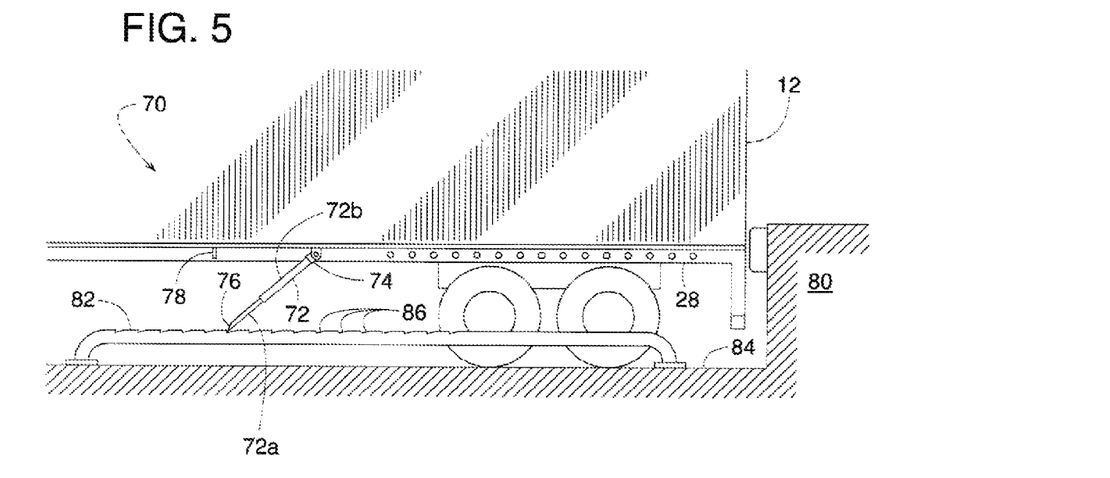
FIG. 5 illustrates the example vehicle restraint of FIG. 4 shown in a holding position.

Alternatively, elongate member 20 or 64 could be attached to and carried by vehicle 12 even as vehicle 12 travels over the road. If engagement end 26, for example, is left fastened to rail 28, anchored end 22 could selectively attach to and release from anchor 24 to respectively restrain and release vehicle 12. In this manner, another aspect of the examples described herein is illustrated in FIGS. 4 and 5. FIG. 4 shows a restraint 70 comprising a vehicle-carried elongate member 72 in a release position, and FIG. 5 shows restraint with elongate member 72 in a holding position.

In this particular example, elongate member 72 has a proximal end 74 pivotally coupled either to rail 28 or to some other suitably surface or component of vehicle 12. The pivotal mounting of member 72 enables a distal end 76 of member 72 to be selectively raised or lowered. When member 72 is raised to the release position of FIG. 4, vehicle 12 is free to travel over the road while carrying member 72. A clip 78 on vehicle 12 can be used to help hold or restrain member 72 when in its release position.

To inhibit or prevent vehicle 12 from moving forward away from a loading dock 80, member 72 is lowered to the holding position of FIG. 5 so that distal end 76 engages some anchor point of dock 80. Examples of such an anchor point include, but are not limited to, a wheel guide rail 82, an elevated protrusion or obstruction mounted to a driveway 84 of dock 80, a detent associated with driveway 84, a frictional or toothed track on driveway 84, and/or the driveway surface itself. In the case where wheel guide rail 82 provides the anchor point, rail 82 preferably includes a series of detents 86 that enable distal end 76 of member 72 to engage rail 82 more securely than what might otherwise be achieved with friction alone.

To accommodate incidental movement of vehicle 12 as the vehicle is being loaded or unloaded of cargo, or to adjust for variations in the distance between proximal end 74 and a certain anchor point 86, the length of elongate member 72 can be made adjustable (e.g., to a certain limited degree). In some cases, for example, member 72 includes two spring-loaded telescoping arms 72a and 72b that provide such adjustment or tolerance to limited vehicular movement. The examples described herein are not limited to telescoping arms, but may include any other suitable length-adjustable mechanism(s) that provide adjustment of elongate member 72.

Figure 6:
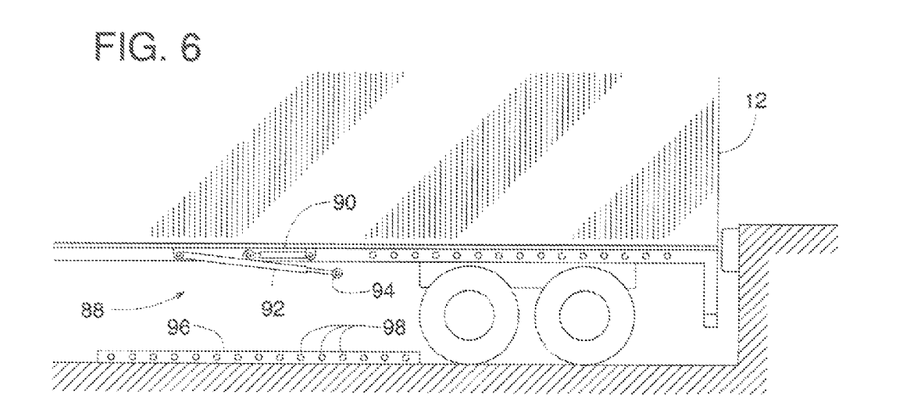
FIG. 6 illustrates yet another example vehicle restraint shown in a release position.
Figure 7:
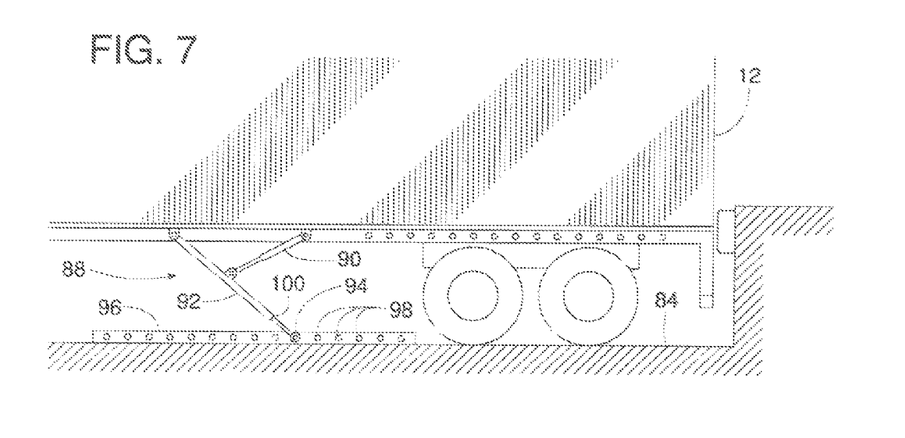
FIG. 7 illustrates the example vehicle restraint of FIG. 6 shown in a holding position.

The pivotal deployment of a vehicle-carried restraint may be manually or under power. FIGS. 6 and 7, for example, show a restraint 88 comprising a power actuator 90 (e.g., hydraulic cylinder, pneumatic cylinder, linear motor, etc.) that pivots an elongate member 92 between its release position of FIG. 6 to its holding position of FIG. 7. To inhibit vehicle 12 from moving forward away from the dock, a distal end 94 of member 88 can be pinned or otherwise temporarily connected to a rail 96 that is mounted to the dock's driveway 84. To help align distal end 94 to a selected hole 98 in rail 96, member 92 can include a length adjustment feature 100 such as, for example, a limited telescoping connection. By forcibly powering member 92 down to its holding position, member 92 can also be used to help prevent or block the vertical movement of vehicle 12 as the vehicle is loaded or unloaded of cargo since in this configuration it acts as a rigid brace preventing such vertical movement.

Figure 8:
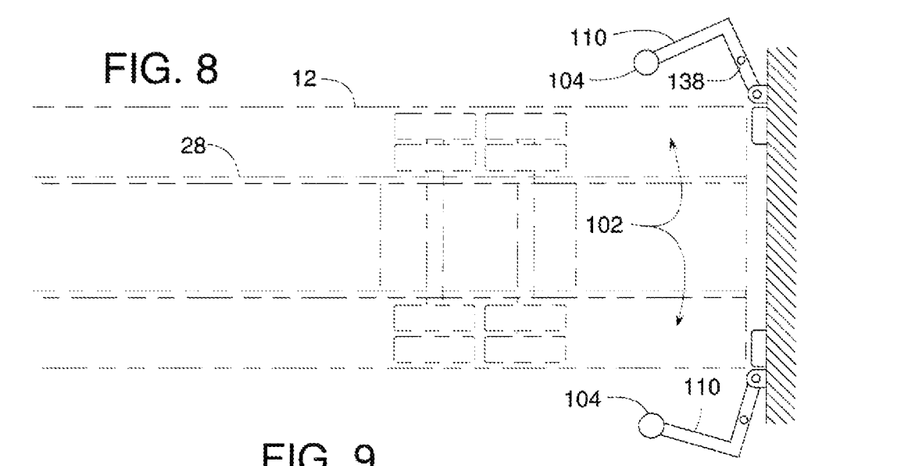
FIG. 8 illustrates yet another example vehicle restraint described herein.
Figure 9:
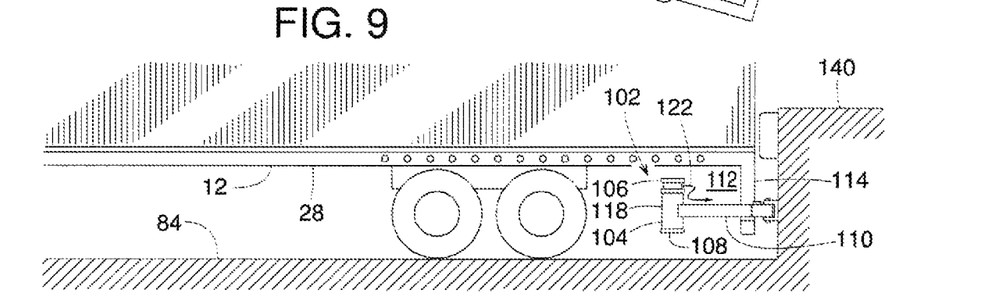
FIGS. 9 & 10 illustrate a side view and a schematic illustration, respectively, of the example vehicle restraint of FIG. 8 shown in a release position.
Figure 10:
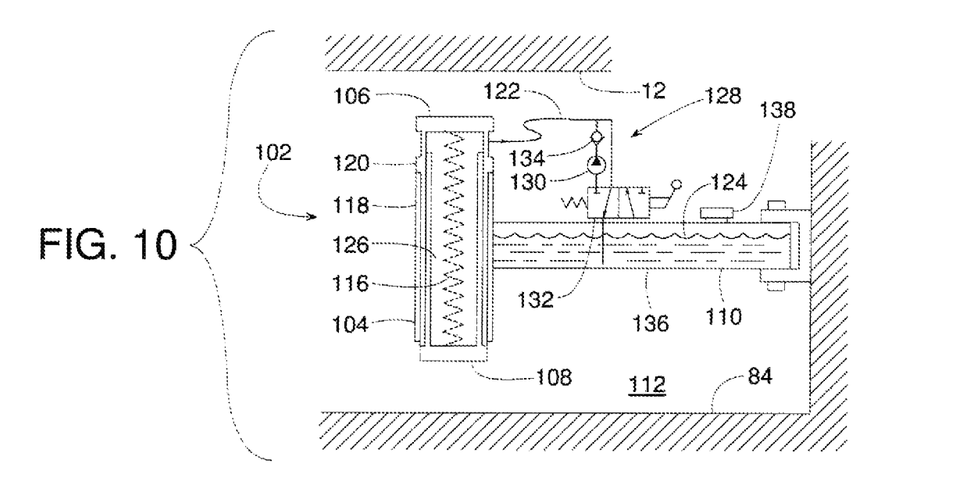
Figure 11:
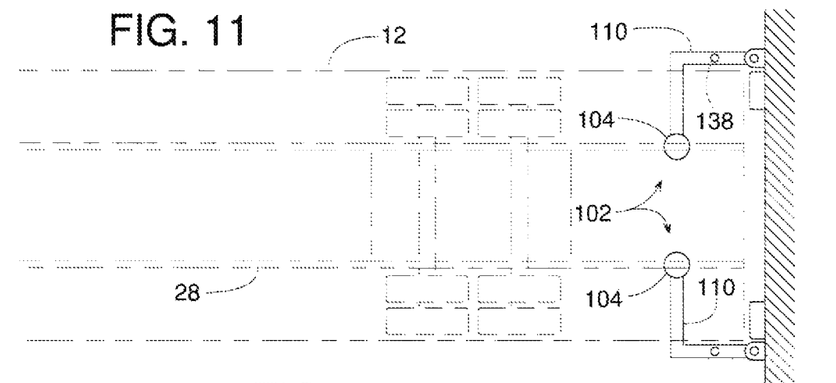
FIGS. 11 & 12 illustrate a planar view and a side view, respectively, of the example vehicle restraint of FIGS. 8-10 shown in a holding position.
Figure 12:
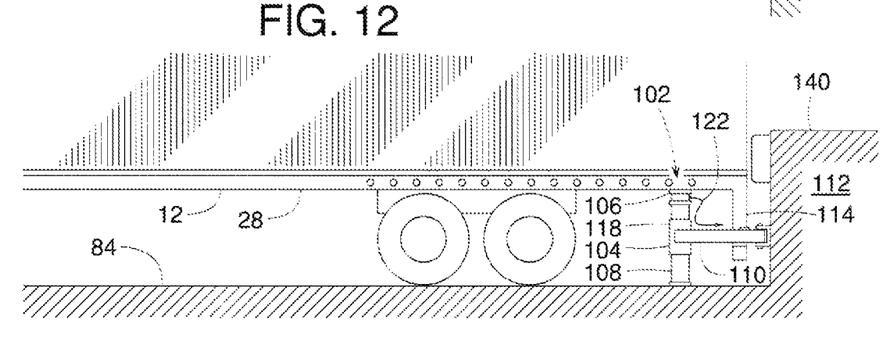
Figure 13:
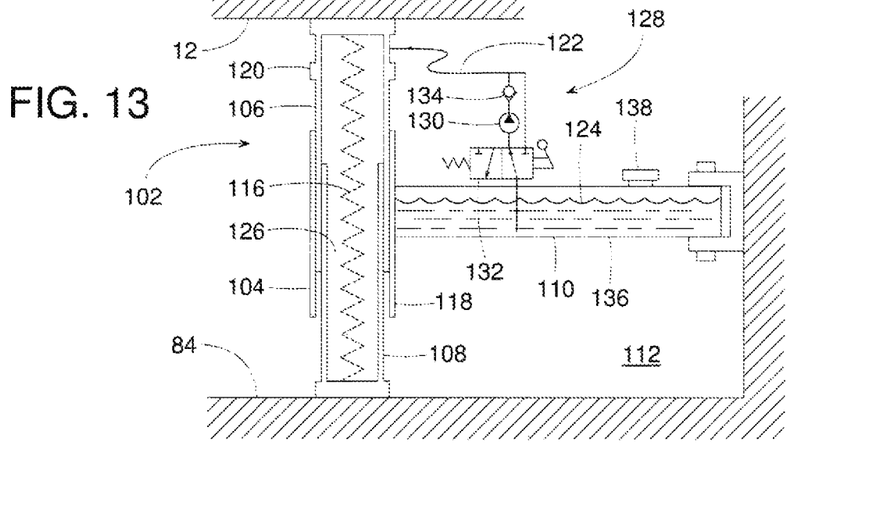
FIG. 13 is an example schematic illustration of the example vehicle restraint of FIGS. 11 & 12.

FIGS. 8-13 show an alternate vehicle restraint 102 where vertical and horizontal movement of vehicle 12 is restricted by one or more hydraulic cylinder assemblies 104 that expand vertically between driveway 84 and rail 28 (or some other comparably rigid (e.g., strong) part of vehicle 12). To release vehicle 12, cylinder assembly 104 retracts a vehicle-engaging upper ram 106 and a driveway-engaging lower ram 108. FIGS. 8-10 show restraint 102 retracted to a release position, and FIGS. 11-13 show restraint 102 expanded to a holding position. Arms 110 pivotally couple cylinder assemblies 104 to dock 112 so that when cylinders 104 are retracted, arms 110 enable cylinders 104 to pivot (e.g., be swung out) from underneath vehicle 12. Moving cylinders 104 beyond the width of vehicle 12 can prevent a low hanging rear impact guard 114 of vehicle 12 from striking restraint 102 as the vehicle 12 enters or departs the loading dock 112.

In some examples, lower ram 108 fits telescopically within upper ram 106, and a tension spring 116 can be used to draw rams 106 and 108 together, as shown in FIG. 10. The two rams 106 and 108 fit slidingly within an outer sleeve 118, which in turn is supported in a cantilever manner by arm 110. Upper ram 106 includes a collar 120 that retains ram 106 with sleeve 118 and prevents ram 106 from dropping out from within sleeve 118.

To extend rams 106 and 108 from their positions of FIG. 10 to that of FIG. 13, a line 122 feeds pressurized hydraulic fluid 124 into an expandable chamber 126 defined by rams 106 and 108. The weight of upper ram 106 acts against its extension, and the weight of lower ram 108 urges the extension of ram 108, thus the pressurized fluid 124 from line 122 causes lower ram 108 to extend first. After lower ram 108 engages driveway 84, upper ram 106 extends to engage vehicle 12 until cylinder assembly 104 expands between driveway 84 and the underside of vehicle 12, as shown in FIG. 13.

Although the hydraulic system for pressurizing cylinder assembly 104 can be provided by various means well known to those of ordinary skill in the art, restraint 102 includes a hydraulic system 128 comprising a hydraulic pump 130, a control valve 132, a check valve 134, and a hydraulic fluid reservoir 136 provided by arm 110 itself. Item 138 is a fill cap for reservoir 136. Pump 130 is schematically illustrated to represent any suitable means for pressurizing fluid 124. Examples of pump 130 include, but are not limited to, an electric pump, a hand-operated pump, and an air-over-oil system where fluid 124 can be pressurized by injecting high-pressure air (e.g., 100 psi) into reservoir 136, etc.

Control valve 132 can be a three-way, two-position valve that is manually actuated (or solenoid actuated) with spring return. In the normally retracted position of FIG. 10, pump 130 is inactive, and line 122 and valve 132 convey hydraulic fluid 124 from within chamber 126 to reservoir 136, wherein fluid 124 moves under the impetus of spring 116 drawing rams 106 and 108 together. To extend cylinder assembly 104, valve 132 is manually actuated to the position shown in FIG. 13, and pump 130 forces fluid 124 through check valve 134 and into chamber 126 to extend rams 106 and 108. If the fluid pressure is insufficient to fully support the weight exerted by vehicle 12, check valve 134 helps prevent cylinder assembly 104 from collapsing or retracting in response to cargo or forklift weight being added to vehicle 12.

In other examples, system 128 may be provided with fluid pressure sufficient to apply a substantially large force (e.g., vertical upward force) against the vehicle 12 (e.g., to actually lift the rear of vehicle 12). Such a system would provide greater frictional holding force to inhibit or prevent vehicle 12 from accidentally pulling away from dock 112. To further prevent pull-away, cylinder assembly 104 may be provided with a locking mechanism (e.g., as shown in FIG. 1) to secure the cylinder to an underside rail of vehicle 12 such as, for example, rail 28 of FIG. 1.

Moreover, such a system could be used to raise the rear edge of vehicle 12 so that the vehicle's truck or trailer bed could be roughly aligned and preferably maintained with (e.g., substantially aligned with) the elevation of the dock's platform 140. The strength and intended function of the "bogey rail" (e.g., rail 28 of FIG. 1) described above (i.e., to support the weight of the loaded trailer box and react/convey forces thereon) provides adequate strength to allow a brace to exert a substantial or sufficient force on the bogey rail to raise and hold the trailer at dock height. Some known vehicle braces typically engage other surfaces or structures of the vehicle, but their upward holding force is limited in order to prevent damage to the vehicle's trailer. Such would not be the case if a brace were applied to the bogy rail, while the trailer is lifted and held fixed at dock height.

At least some of the aforementioned examples include one or more features and/or benefits including, but not limited to, the following:

In some examples, an elongate member anchored at a loading dock restrains a vehicle at the dock by attaching to a rail that is on the underside of the vehicle.

In some examples, a vehicle restraint restrains a vehicle at a loading dock by engaging a rail that is normally used for adjusting the position of the vehicle's rear wheels. The restraint can clamp onto the rail, or the restraint might include a pin that engages one of a series of holes in the rail.

In some examples, a vehicle restraint restrains a vehicle at a loading dock by engaging a rail that runs lengthwise along the vehicle's support frame. The restraint can clamp or latch onto the rail. The restraint, for example, might include a pin that engages a hole in the rail.

In some examples, a telescoping elongate member restrains a vehicle at a loading dock by engaging a rail that runs lengthwise along the vehicle's support frame and is a part thereof. The elongate member can clamp or latch onto the rail. The restraint, for example, might include a pin that engages a hole in the rail.

In some examples, the elongate member includes a feature such as a slot that allows some play or relative movement between the vehicle and the loading dock, thereby facilitating the engagement and disengagement of the elongate member.

In some examples, a manually operable elongate member for restraining a vehicle at a loading dock includes an electric sensor for determining whether the vehicle is actually restrained or released.

In some examples, the elongate member has an adjustable length between an engagement end that is to engage a vehicle to restrain the vehicle and an anchored end that is pivotally coupled to the loading dock.

In some examples, a vehicle restraint retains a vehicle at a loading dock by selectively pivoting an elongate member coupled to the vehicle to engage an anchor point associated with the loading dock. The anchor point, for example, may include a wheel guide rail.

In some examples, the elongate member is pivotally coupled to a vehicle and powered via an actuator supported by the vehicle. The actuator moves the elongate member between a release position and a holding position to engage an anchor point such as an elevated wheel guide rail fastened to a driveway of a loading dock.

In some examples, a vehicle restraint includes a hydraulic cylinder having an upper and lower ram coupled to an arm such that the arm adjusts the position of the hydraulic cylinder relative to the vehicle. The upper and lower portions of the hydraulic cylinder are selectively configured between a holding position and a release position. In the holding position, for example, the upper rams engage a rail portion of the vehicle and the lower rams engage a supporting surface. While in the holding position, the vehicle restraint prevents downward deflection of the vehicle. Additionally, when in the holding position, the vehicle restraint may act as a brace that exerts a substantial force on the vehicle rail to raise and hold a rear portion of the vehicle so that a bed of the rear portion of the vehicle is substantially aligned with a dock platform.

Although the invention is described with respect to a preferred embodiment, modifications thereto will be apparent to those of ordinary skill in the art. The scope of the invention, therefore, is to be determined by reference to the following claims:

The invention claimed is:

1. A restraint for restraining a vehicle at a loading dock, comprising:
a brace movable between a holding position and a release position, the brace to restrain the vehicle in the holding position to restrict movement of the vehicle relative to the loading dock, the brace to release the vehicle in the release position to allow the vehicle to move relative to the loading dock, the brace having a first portion and a second portion, in the holding position the first portion of the brace engages a supporting portion of the vehicle and the second portion of the brace engages a non-movable structure at the loading dock, to position the brace in the holding position the first portion of the brace is to move in a first direction away from the second portion of the brace to engage the supporting portion of the vehicle and the second portion of the brace is to move away from the first portion in a second direction to engage the non-movable structure at the loading dock, and to position the brace in the release position the first portion of the brace is to move in the second direction toward the second portion of the brace and the second portion of the brace is to move in the first direction toward the first portion of the brace, the first direction being different than the second direction.

2. A restraint of claim 1, wherein the supporting portion of the vehicle is substantially parallel to the non-movable structure at the loading dock.

3. A restraint of claim 1, further comprising an arm supporting the brace and being attachable to the loading dock, the arm to adjust the position of the brace relative to the vehicle.

4. A restraint of claim 3, wherein the arm pivotally couples to the loading dock to enable the brace to swing relative to an underneath area of the vehicle.

5. A restraint of claim 1, wherein the first portion is telescopically coupled relative to the second portion.

6. A restraint of claim 1, wherein the first and second portions move via a hydraulic system.

7. A restraint of claim 1, wherein the first and second portions move in opposite directions.

8. A restraint of claim 1, wherein the supporting structure is a rail of the vehicle and the non-movable structure is a driveway, and the upper and lower rams expand vertically in opposite directions between the driveway and the rail when the ram is in the holding position.

9. A restraint for restraining a vehicle at a loading dock, comprising:
a ram having an upper ram portion and a lower ram portion;
an arm supporting the ram and being attachable to the loading dock, the arm to adjust the position of the ram relative to the vehicle, the ram being selectively configurable to a holding position and a release position such that
a) in the holding position, the ram is positioned underneath the vehicle and the upper ram portion is to extend in a first direction relative to the lower ram portion to engage the vehicle and the lower ram portion is to extend in a second direction relative to the upper ram portion to engage a non-movable location at the loading dock; and
b) in the release position, the upper ram portion is to retract in the second direction relative to the lower ram portion to disengage the vehicle and the lower ram portion is to retract in the first direction relative to the upper ram portion to disengage the non-movable location.

10. A restraint of claim 9, wherein ram comprises a hydraulic cylinder and the arm contains a hydraulic fluid to actuate the upper and lower ram portions.

11. A restraint of claim 8, wherein the ram is to prevent downward movement of the vehicle when the ram is in the holding position.

12. A restraint of claim 9, further comprising a resilient element disposed within the cylinder to urge the first ram toward the second ram.

13. A restraint of claim 9, wherein the ram is to exert a substantial force on the vehicle to raise and hold a rear portion of the vehicle when the ram is in the holding position.

14. A restraint of claim 9, wherein the ram is to substantially align a bed of a rear portion of the vehicle with a dock platform of the loading dock when the ram is in the holding position.

15. A restraint of claim 9, wherein the upper ram portion and the lower ram portion extend in opposite directions when the ram is in the holding position.

16. A restraint of claim 15, wherein the upper and lower ram portions extend and retract in vertical alignment with another.

17. A restraint for restraining a vehicle at a loading dock, comprising:
a ram comprising an upper ram portion and a lower ram portion;
an arm supporting the ram and being attachable to the loading dock such that the arm can be used for adjusting the position of the ram relative to the vehicle, the ram being selectively configurable to a holding position and a release position such that
c) in the holding position, the ram is underneath the vehicle with the upper ram portion engaging the vehicle and the lower ram portion engaging a non-movable location at the loading dock; and
d) in the release position, the upper ram portion is spaced-apart from the vehicle and the lower ram portion is spaced-apart from the non-movable location,
wherein the arm pivotally couples to the loading dock to enable the ram to swing relative to an underneath area of the vehicle.

18. A method of restraining a vehicle relative to a loading dock, the method comprising:
positioning a brace to one of a stored position at which the brace is away from the vehicle or a use position at which the brace is adjacent a supporting portion of the vehicle, the brace having a first portion and a second portion, the first and second portions to move in opposite directions relative to each other when moving to the use position to restrain a vehicle at a the loading dock;
moving the first portion of the brace in a first direction away from the second portion of the brace to engage the supporting surface of the vehicle when the brace is in the use position; and
moving the second portion of the brace in a second direction away from the first portion to engage a non-movable location at the loading dock when the brace is in the use position.

19. A method of claim 18, further comprising activating an arm coupled to the brace to position the brace adjacent the supporting surface of the vehicle.

20. A method of claim 18, further comprising urging the first portion in the second direction and urging the second portion in the first direction when the brace is in the stored position.

* * * * *

UNITED STATES PATENT AND TRADEMARK OFFICE
CERTIFICATE OF CORRECTION

PATENT NO. : 8,662,535 B2  
APPLICATION NO. : 13/073418  
DATED : March 4, 2014  
INVENTOR(S) : Andersen et al.

Page 1 of 1

It is certified that error appears in the above-identified patent and that said Letters Patent is hereby corrected as shown below:

In the Claims  
Column 8, line 4 (claim 11), replace --8-- between "claim" and "wherein" with --9--.  
Column 8, line 50 (claim 18), delete "a" between "at" and "the".

Signed and Sealed this  
Third Day of June, 2014

Michelle K. Lee  
*Deputy Director of the United States Patent and Trademark Office*